United States Patent [19]

Hines

[11] 4,157,214

[45] Jun. 5, 1979

[54] APPARATUS FOR SHOWING MICRODOCUMENTS

[75] Inventor: Stephen P. Hines, Rochester, N.Y.

[73] Assignee: Eastman Kodak Company, Rochester, N.Y.

[21] Appl. No.: 854,926

[22] Filed: Nov. 25, 1977

Related U.S. Application Data

[63] Continuation of Ser. No. 675,100, Apr. 9, 1976, abandoned.

[51] Int. Cl.² .................... G03B 21/30; G03B 21/56; G02B 3/08
[52] U.S. Cl. .......................................... 353/70; 350/9; 350/122; 350/211; 352/104; 353/75
[58] Field of Search ................... 353/70, 74, 75, 76, 353/77, 78; 350/9, 211, 122; 352/104

[56] References Cited

U.S. PATENT DOCUMENTS

| | | | |
|---|---|---|---|
| 2,891,444 | 6/1959 | Ewald | 350/9 |
| 3,253,505 | 5/1966 | Miller | 353/70 |
| 3,658,415 | 4/1972 | Miles | 353/74 |
| 3,930,723 | 1/1976 | Holt | 353/70 |

*Primary Examiner*—Steven L. Stephan
*Attorney, Agent, or Firm*—Warren W. Kurz

[57] ABSTRACT

A compact microimage viewing apparatus is disclosed which utilizes a low intensity light source with wide-angle projection optics to provide a clear and highly illuminated image to the viewer. To achieve compactness, the high brightness light-distributive screen of the viewing apparatus is located at an acute angle to the axis of projection of the projection lens. Keystone distortion of the projected image is substantially eliminated by employing a correcting lens, preferably a Fresnel lens, between the screen and the viewer at a predetermined angle to the screen such that the image portion projected onto the edge of the screen nearest to the projection lens, which would otherwise appear smaller to the viewer than would the image portion projected onto the farthermost edge of the screen, is magnified to an extent that a rectangular and substantially non-distorted image is presented to the viewer.

13 Claims, 3 Drawing Figures

APPARATUS FOR SHOWING MICRODOCUMENTS

This is a continuation, of application Ser. No. 675,100, filed Apr. 9, 1976 now abandoned.

BACKGROUND OF THE INVENTION

1. Field of the Invention

This invention relates generally to microdocument viewing apparatus and more particularly it relates to a compact microimage reader with means employed along its optical path to substantially eliminate any keystone distortion of the image.

2. Description of the Prior Art

Along with the growing need to compact large volumes of information, e.g., on microfilm, there has been a commercial need for compact and lightweight viewing apparatus to make these compacted volumes of information readily available to the user. This growing commercial need has resulted in several compact viewing apparatus which have attempted to produce highly illuminated images with a minimum amount of image distortions. These prior art apparatus have generally been plagued with one or more of the following problems: (1) "hot spots," i.e., formation of areas of excessive light intensity at the center of the viewing surface; (2) overheating of the apparatus housing; (3) the general bulkiness of the reader; and (4) the overall high cost of the apparatus.

In order to achieve the maximum compactness in the usual prior art viewing apparatus which employs a narrow-angle projection lens, i.e., a lens which projects a beam over a full angle of about 30° or less, several mirrors or other reflective surfaces are required. For example, one prior art viewing apparatus making use of a narrow-angle projection lens required a telescopically arranged two-part housing structure to contain the reader. The reader consisted of a main housing portion which contained a light source, a microform receiving station and a narrow-angle optical projection system. A second housing portion contains two mirrors, swingably mounted with respect to each other and the housing, and a screen member to receive light reflected from the two mirrors. While such prior art apparatus can be made to appear compact when not in use, it requires substantial space during operation.

In the viewing apparatus art it is desirable that the image be projected onto a light-distributive screen in such a manner that the image will appear to be rectangular and evenly illuminated to the viewer. However, in attempts to maximize on compactness of the apparatus, some viewing apparatus have made use of a light-distributive screen which has been positioned at an acute angle to the projection lens rather than perpendicular to the lens along its optical path; and in such apparatus, the projected image will have the undesirable feature of being keystoned, i.e., image projected onto the edge of the screen closest to the projection lens appears smaller to the viewer than does the image projected onto the farthermost edge of the screen.

Where the light-distributive screens of the prior art apparatus have been of the type having non-matte surfaces (e.g., highly directional flat aluminum foil screens), areas of excessive light intensity, i.e., "hot-spots," occur on the viewing surface, if light is projected onto the screen in a manner producing divergingly deflected rays.

Several prior art apparatus have attempted to solve the problems of keystoning, "hot spots," etc. incurred in designing compact apparatus by making use of several mirror surfaces in the projected light path (e.g., to eliminate keystoning) and by spherically curving the screen to converge the light towards the center of the screen (e.g., to eliminate "hot spots"). While such prior art apparatus is not necessarily plagued with the problems of keystone distortion or "hot spots," the apparatus outer housing is limited in its minimum size.

SUMMARY OF THE INVENTION

In view of the problems outlined above, it is apparent that there is a long-felt commercial need for a compact microimage reader which can produce a highly illuminated image which is free of any keystoning or other distortions at the viewing surface.

Accordingly, it is an object of the present invention to provide an improved compact reader.

It is a further object of the present invention to provide a compact viewing apparatus which makes use of a wide-angle projection lens to project an image onto a reflective surface such as a screen.

These objects, along with certain other advantages of the present invention, are accomplished by incorporating into a very compact apparatus housing a light source to illuminate an area of film; a wide-angle projection lens which projects an image of the film onto a flat high brightness light-distributive screen or other reflective surface which is positioned along the optical path of the projection lens at an acute angle to the projection axis of the lens; and a correcting lens, preferably a Fresnel lens, angularly disposed relative to the high brightness light-distributive screen or other reflective surface such that the smallest edge of the image projected onto the screen is magnified to a point that it appears to the viewer to be equal in size to the larger edge of the projected image.

BRIEF DESCRIPTION OF THE DRAWINGS

The objects, advantages and characteristic features of the subject invention will be in part apparent from the accompanying drawings, and in part pointed out in the following detailed description of the invention in which reference will be made to the accompanying drawings wherein like reference numerals designate corresponding parts, and wherein.

DETAILED DESCRIPTION OF THE PREFERRED EMBODIMENTS

Figure 1:
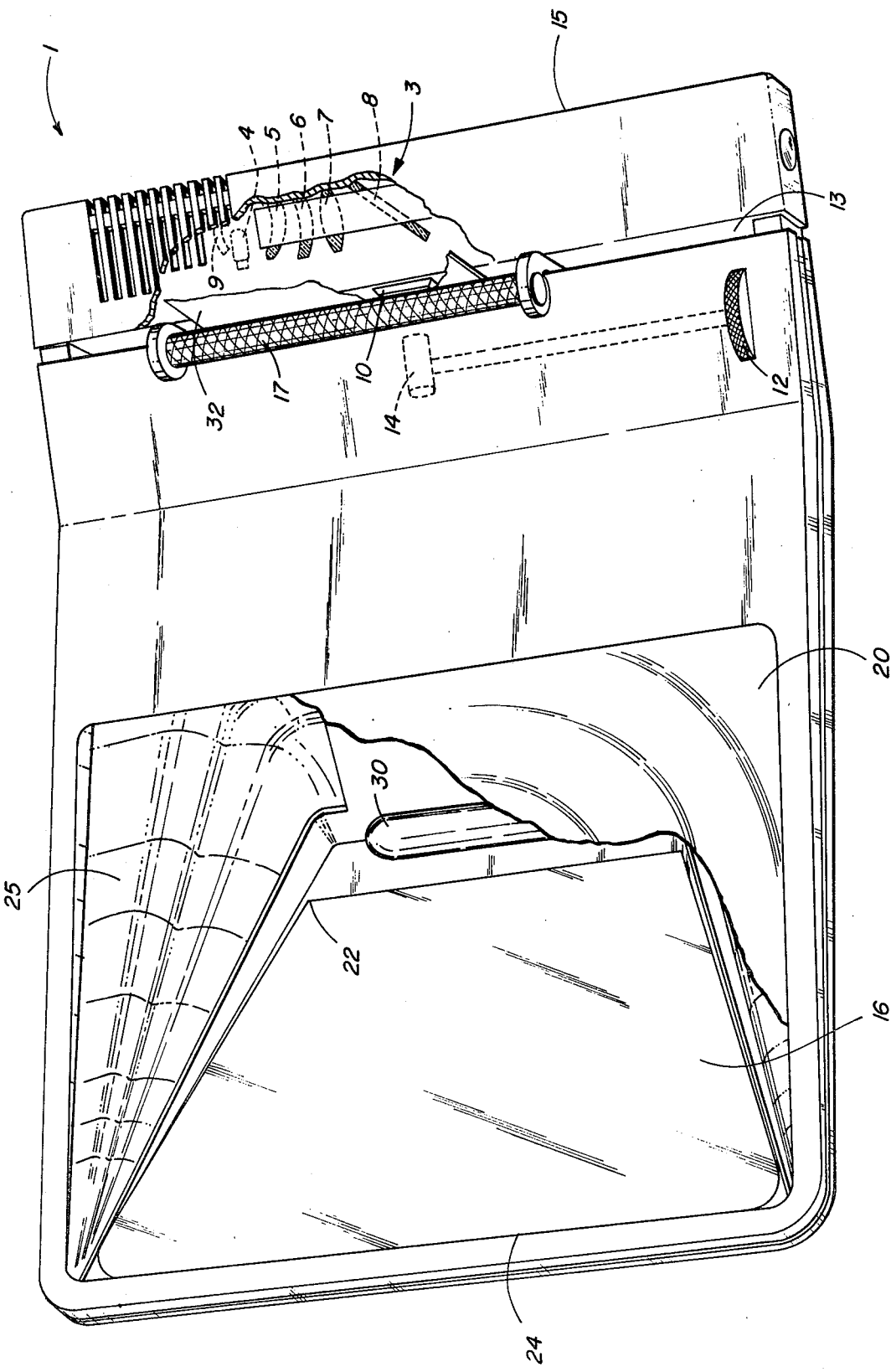
FIG. 1 is a front perspective view of one embodiment of the viewing apparatus incorporating the invention, the apparatus being shown in its open position with some of its parts shown in phantom and some parts broken away for illustration.

The compact microimage reader 1 shown in FIG. 1 has a wide-angle condenser system 3 which comprises lenses 5, 6 and 7 which operate to converge light from source 4 towards mirror 8. The light is reflected from mirror 8 towards lens 10, which converges the light such that it passes through the center of lens 14. A spherical reflector 9 is located in close proximity to source 4 and along the center axis of lenses 5, 6 and 7. The apparatus further comprises a condenser housing 15, a film slit 13, an adjustable film guide 17 and a focusing knob 12 used to focus a projected image onto light-distributive screen 16 which is positioned along the optical path of lens 14 at an acute angle relative to lens 14. Screen 16 is also positioned at an angle $\alpha$ relative to lens 20 (see FIG. 2). In FIG. 1, lens 20 has been partially cut away to illustrate screen edges 22 and 24 and a bellows arrangement 25.

When reader 1 is in its open position, screen 16 is separated from correction lens 20 (here a Fresnel lens) by a predetermined acute angle $\alpha$. A bellows arrangement 25 together with an internal bi-stable latch 30 locks and supports the screen of the reader in its open position (see FIG. 2). The bellows arrangement further prevents any light from escaping the optical path along which an image is projected and also rejects any ambient light from a source other than source 4. Microdocument 32 is inserted into film slit 13 and is illuminated by light from source 4. Once source 4 is energized, lenses 5, 6, 7 and 10 converge light inwards at an angle towards the center of lens 14 and onto the reflective projection screen 16. Spherical reflector 9 also reflects light from source 4 along the path described.

Projection lens 14 is capable of projecting an image of document 32 diagonally onto the screen 16 over a wide angle, e.g., having an angle of field coverage from about 30° to 80° and as used in the specification and claims of this specification the term "wide-angle" lens is used to denote a lens having an angle of field coverage in that range. Condenser system 3 is desirably capable of gathering substantially all of the light which diverges from source 4 over an angle at least equal to the angle of field coverage of projection lens 14 and concentrating the light through lens 14. By making use of a wide-angle projection lens the distance from the projection lens 14 to screen 16 (i.e., the optical path length for lens 14) can be minimized. To effectively utilize the compactness capability evolving from use of the wide-angle lens, the projected image is directed to the viewer via a single light deflecting surface 16, located at an acute angle to the axis of projection lens 14. However, when an image is projected by lens 14 onto screen 16 along a non-normal axis, the projected image, in the absence of some correcting means, appears to the viewer to be keystoned, i.e., the image projected onto screen edge 22 which is closest to lens 14 appears to be smaller in size than does the image which is projected onto the farthermost edge 24 of the screen.

A magnifying lens 20 (here a Fresnel lens) is positioned relative to screen 16 such that the vertex of angle $\alpha$ is located at screen edge 24 which is farthermost from lens 14. This is done to effect a gradually increasing magnification of the image from the farthermost edge 24 of screen 16 to the edge 22 of the screen which is closest to lens 14. That is, the image appearing on the screen between edges 24 and 22 will be magnified, with the image portions proximate edge 24 being magnified much less than the image portions proximate edge 22. Angle $\alpha$ is chosen such that the image proximate screen edge 22 is magnified to a point that the entire image when viewed, will appear to be rectangular on screen 16, i.e., the image on and proximate screen edge 22 will appear to be equal in size to the image on and proximate screen edge 24.

Figure 2:
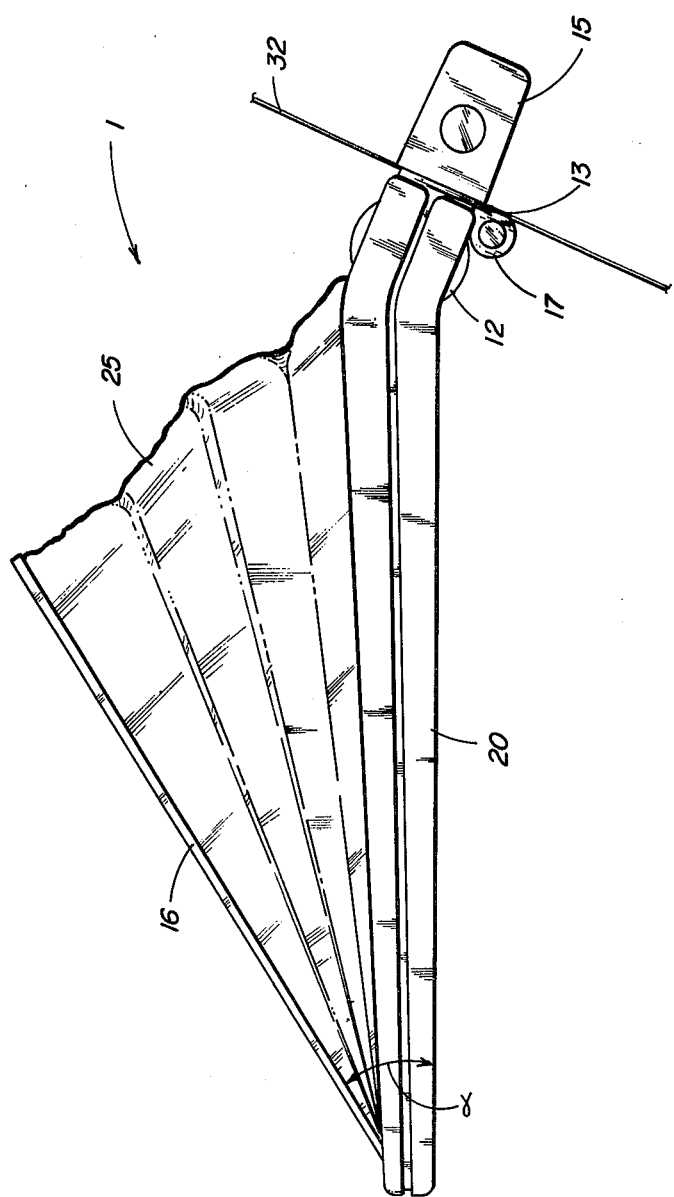
FIG. 2 illustrates a top plan view of the FIG. 1 apparatus in its open position.

FIG. 2 illustrates a top plan view of the viewing apparatus in its open and operative viewing position. The figure further illustrates the bellows arrangement 25 which together with an internal bi-stable latch 30 locks the reader in its open position. Magnifying lens 20 is shown positioned at an angle $\alpha$ relative to screen 16.

Figure 3:
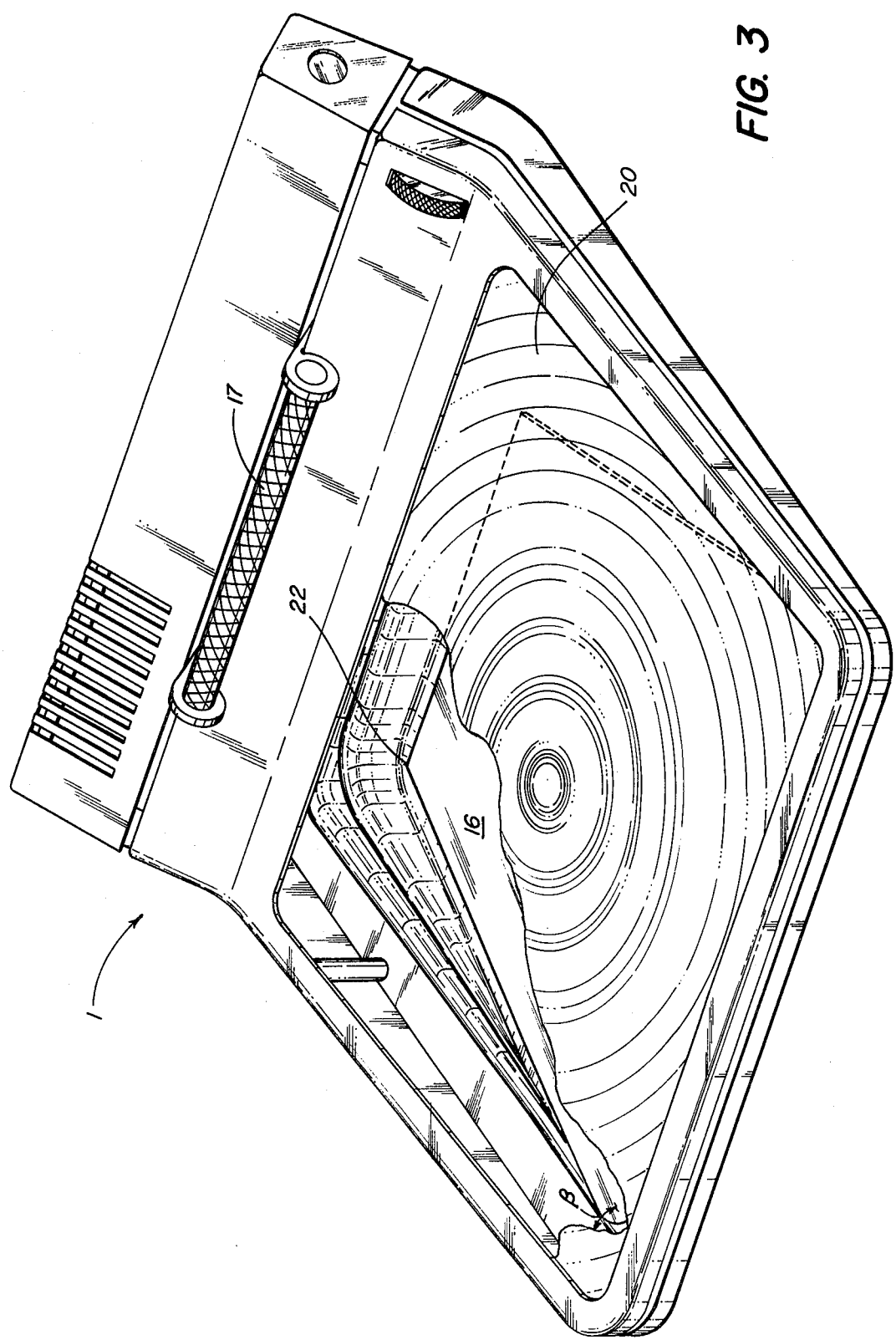
FIG. 3 is a top perspective view of the apparatus shown in FIG. 1 but in the closed position.

FIG. 3 illustrates the microimage reader 1 in its most compact state, i.e., the closed inoperative position. In this closed position the Fresnel lens 20 is located near screen 16 at a very small angle $\beta$ relative to screen 16. Fresnel lens 20 has been cut away to illustrate both the bellows arrangement 25, which is collapsed when reader 1 is in the closed position, and the edge of screen 16 which is located closest to the projection lens (not shown) and which will bear the portion of the projected image which will be magnified most by the Fresnel lens.

A specific embodiment of the invention was constructed using a flat aluminum Ektalite ® screen (Ektalite is a trademark of Eastman Kodak Company), a 10 watt light source, a blue colored plastic Fresnel lens with a 140 mm focal length and a 12.5 mm projection lens having a full diagonal angle of field coverage of 59°. The projection lens axis was positioned at a 20° angle to the plane of the Fresnel lens and oriented so that the maximum field of coverage extended diagonally across the screen. The screen was located, in its operative orientation, so that the projection axis of the lens formed a 44.95° angle relative to a line normal to the screen surface. Thus, a 25.05° angle $\alpha$ was provided between the screen and the Fresnel lens to substantially correct the keystone distortion in the image.

In the above specific example, the 10 watt light source was undervolted to provide for a longer life. This resulted in the light emitted by the source being of a slightly yellowish color. However, when the yellow-colored image light passed through the blue colored Fresnel lens the yellow color was filtered out to restore the white color to the image.

The angle $\alpha$ between screen 16 and lens 20 may vary from the 25.05° found suitable for the above specific example. For instance, if a screen concaved towards lens 20 is used in the apparatus instead of a flat screen, a Fresnel lens having a longer focal length (greater than 140 mm) would be appropriate. That is, a concave screen will converge some of the light towards the viewer's eyes, a function which must be performed totally by the Fresnel lens where a flat screen is used. When both the Fresnel lens and the concave screen operate to converge the light towards the viewer's eyes, less convergence is effected by the Fresnel lens. With a weaker Fresnel lens, i.e., a lens having a focal length greater than 140 mm, the Fresnel lens must be positioned farther away from the smaller edge of the projected image, edge 22, for adequate magnification; thus the angle $\alpha$ will be larger than the 25.05° angle in the above example.

Angle $\alpha$ will also vary if the angle between screen 16 and the axis of projection of lens 14 varies. That is, if lens 14 projects light onto screen 16 at an angle such that the angle between the projected beam and a line normal to the screen is less than the 44.95° angle in the above example, the angle $\alpha$ will decrease, since the image projected onto screen edge 22 will need less magnification to appear equal in size to the image projected onto edge 24. Conversely, if light is projected onto screen 16 such that the angle between the projected beam and the line normal to screen 16 is greater than 44.95°, the angle $\alpha$ will be larger than the 25.05° angle in the above example, since the image projected onto screen edge 22 will need more magnification to appear equal in size to the image projected onto edge 24.

The use of a Fresnel lens as the correcting lens 20 also operates to eliminate "hot spots" i.e., localized areas of excessive light intensity, at the viewing surface since the Fresnel lens converges the illumination from across the entire screen surface to the viewer's eye. Thus the undesirable presence of "hot spots" at the viewing surface is not a problem in the apparatus.

Also, the Fresnel lens is preferred over a solid continuous surface lens because of its lightweight and its uniform thickness, which allowed for easy molding and will permit the addition of a filter dye directly into the lens material itself instead of applying the filter as a separate layer.

While the invention has been described in the embodiment of a front projection reader which makes use of a light-distributive screen as opposed to a reflective surface, e.g., mirror, etc., it should be understood that the invention is also advantageous in certain embodiments of rear projection readers which incorporate both a reflective surface and a screen. Keystone distortion of the projected image can be a problem in the rear projection configurations and correction of this distortion and "hot spots" can be eliminated with a Fresnel field lens adjacent to the rear projection screen surface.

The invention has been described in detail with particular reference to certain preferred embodiments thereof, but it will be understood that variations and modifications can be effected within the spirit and scope of the invention.

I claim:

1. A compact microdocument reader comprising:
 a light source;
 a projection gate for positioning a microdocument which is to be read;
 a wide-angle condenser system for concentrating light from said light source on a microdocument positioned at said projection gate, thereby illuminating said microdocument;
 a wide-angle projection lens
 a light-distributive screen, positioned at an acute angle to the axis of projection of said projection lens whereby a first image portion projected by said lens onto the edge of said screen which is positioned closest to said projection lens is smaller in size than is a second image portion projected on the edge of said screen farthermost from said projection lens; and
 a Fresnel lens, disposed relative to said light-distributing screen at a predetermined angle such that the first image portion is magnified by said Fresnel lens to a point such that it appears to a viewer, viewing said first and second image portions through said Fresnel lens, equal in size to the second image portion.

2. A compact microimage viewer comprising:
 (a) a housing;
 (b) a projection screen mounted within said housing, said screen having a light-distributive surface upon which an image may be focused for viewing;
 (c) a wide-angle projection lens mounted within said housing for projecting an enlarged image of an illuminated microdocument onto said screen, said lens having an optical axis, and said screen being angularly disposed relative to said axis such that one side of said screen surface is closer to said lens than the opposite side of said screen surface, whereby a first image portion projected by said lens onto said one side of said screen surface is smaller in size than is a second image portion projected onto said opposite side of said screen surface; and
 (d) a correcting lens mounted in said housing, said lens having an optical axis which is disposed at a predetermined angle relative to the normal to said screen surface so as to differentially magnify an image projected onto said screen surface by said projecting lens in a manner such that said first and second image portions appear substantially equal in size to a viewer who views said screen through said correcting lens.

3. The microimage viewer defined by claim 2 wherein said correcting lens is at least substantially coextensive in size with said screen.

4. The microimage viewer defined by claim 2 wherein one side of said correcting lens is spaced further from said one side of said screen than an opposing side of said correcting lens is spaced from said opposite side of said screen.

5. The microimage viewer defined by claim 2 wherein said correcting lens and said screen form an angle, the vertex of which is located proximate the edge of said screen furthermost from said projection lens, whereby said first image portion is magnified more than said second image portion.

6. The microimage viewer defined by claim 2 wherein said screen is mounted on said housing for movement between an inoperative position in which an entire surface of said screen surface is positioned adjacent said correcting lens, and an operative position in which one edge of said screen is spaced further from said correcting lens than is the opposing edge of said screen, whereby said screen and said lens may be angularly disposed relative to each other.

7. The microimage viewer defined by claim 6 wherein said opposing edge of said screen, when said screen is in said operative position, is positioned proximate one edge of said correcting lens.

8. The microimage viewer defined by claim 6 wherein said screen and said lens are connected by a bellows.

9. The microimage viewer defined by claim 2 wherein said correcting lens is a Fresnel lens.

10. A compact microimage viewer comprising:
 (a) a housing;
 (b) a projection screen mounted within said housing said screen having a substantially planar image-viewing surface;
 (c) a wide-angle projection lens mounted within said housing for projecting an image of a microdocument onto said surface, said projection lens having an optical axis, and said screen being angularly disposed relative to said axis such that one edge of said screen is closer to said lens than the opposite edge of said screen, whereby a rectangularly shaped microdocument is projected onto said screen surface as a keystone shaped image; and
 (d) a keystone-compensating lens mounted in said housing proximate said screen said lens being at least substantially co-extensive in size with said image-viewing surface and being angularly disposed with respect to said surface so that said keystone-shaped image is made to appear rectangular in shape to a viewer viewing said image through said keystone-compensating lens.

11. The microimage viewer defined by claim 10, wherein the vertex of the angle formed between said keystone-compensating lens and said screen surface is located proximate said opposite edge of said screen.

12. A compact microimage viewer comprising:
   (a) a housing;
   (b) a projection screen mounted within said housing, said screen having a light-distributive surface upon which an image may be focused for viewing;
   (c) a wide-angle projection lens mounted within said housing for projecting an enlarged image of an illuminated microdocument onto said screen, said lens having an optical axis, and said screen being angularly disposed relative to said axis such that one side of said screen surface is closer to said lens than the opposite side of said screen surface, whereby a first image portion projected by said lens onto said one side of said screen surface is smaller in size than is a second image portion projected onto said opposite side of said screen surface; and
   (d) a Fresnel lens for differentially magnifying an image projected on said screen surface so that said first and second image portions appear equal in size to a viewer who views the screen through said Fresnel lens, said Fresnel lens being disposed at an angle relative to said screen, said angle having a vertex located proximate the edge of said screen which is spaced furthermost from said projection lens.

13. The microimage viewer defined by claim 12 wherein said Fresnel lens is at least as large as said screen.

* * * * *